United States Patent [19]

Withnall

[11] Patent Number: 4,769,142
[45] Date of Patent: Sep. 6, 1988

[54] AMPHIBIOUS OIL SPILL ABSORBING MACHINE

[76] Inventor: Gordon D. H. Withnall, 44 Banks Street, Padstow, NSW 2211, Australia

[21] Appl. No.: 934,569

[22] Filed: Nov. 25, 1986

[51] Int. Cl.⁴ ............................................. C02F 1/40
[52] U.S. Cl. .............................. 210/242.4; 210/248; 210/924
[58] Field of Search ................. 210/242.1, 242.4, 248, 210/776, 154, 923, 924, 351

[56] References Cited

U.S. PATENT DOCUMENTS

| | | | |
|---|---|---|---|
| 1,379,176 | 5/1921 | Foster | 210/923 |
| 3,536,615 | 10/1970 | Bunn | 210/925 |
| 3,539,508 | 11/1970 | Bulkley et al. | 210/242.4 |
| 3,546,112 | 12/1970 | Will et al. | 210/242.4 |
| 3,670,896 | 6/1972 | Hale, Jr. et al. | 210/923 |
| 3,682,316 | 8/1972 | Waren | 210/923 |
| 3,685,653 | 8/1982 | Van Stavern et al. | 210/776 |
| 3,702,297 | 11/1972 | Maksini, Jr. | 210/242.4 |
| 3,962,083 | 6/1976 | Goldman | 210/242.4 |
| 3,968,041 | 7/1976 | De Voss | 210/242.3 |
| 4,061,569 | 12/1977 | Bennett et al. | 210/924 |
| 4,514,299 | 4/1985 | Ayroldi | 210/242.4 |
| 4,555,338 | 11/1985 | Marchionda | 210/242.4 |
| 4,575,426 | 3/1986 | Littlejohn et al. | 210/242.4 |

FOREIGN PATENT DOCUMENTS

| | | | |
|---|---|---|---|
| 2735548 | 8/1979 | Fed. Rep. of Germany | 210/242.4 |
| 2396124 | 2/1979 | France | 210/242.4 |

*Primary Examiner*—Peter Hruskoci
*Assistant Examiner*—Coreen Y. Lee
*Attorney, Agent, or Firm*—Hayes, Davis & Soloway

[57] ABSTRACT

An amphibious self-contained oil spill absorbing machine having a chassis supported and propelled on land by front and rear rollers. The front roller has a covering of oil absorbing material and works against a pinch roller to squeeze oil absorbed by the covering into a trough for collection. The machine may be driven into the water supported by floats adjustable by rams to control the depth of penetration of the roller. Operation is possible in shallow water, on beaches and in estuary conditions.

7 Claims, 3 Drawing Sheets

AMPHIBIOUS OIL SPILL ABSORBING MACHINE

BACKGROUND OF THE INVENTION

This invention relates to an oil spill absorber and has been devised particularly though not solely for the removal of oil spills floating on the surface of the water and on adjacent beach or estuary areas.

In the past many proposals have been made for various methods and apparatus to deal with the problem of oil spilt onto water, for example in tanker accidents or from other sources. Such apparatus is generally difficult and time consuming to deploy, requiring the setting up of booms or other gathering or restraining systems before the oil and water can be treated for the removal of the oil. It has also proven difficult in the past to remove oil spilt in shallow water or estuary or beach conditions where a layer of oil has been deposited on the land surface as well as floating on the surface of the water.

SUMMARY OF THE INVENTION

It is therefore an object of the present invention to provide an oil spill absorbing machine which will obviate or minimise the foregoing disadvantages in a simple yet effective manner, or which will at least provide the public with a useful choice.

Accordingly, the invention consists in an amphibious oil spill absorbing machine comprising a chassis, at least one oil absorbing roller having an oil absorbing covering and being rotatably mounted transversely across the chassis and positioned with the lower periphery thereof below the chassis such that the chassis may be at least partially supported on land by the oil absorbing roller, flotation means adapted to float the machine in water and/or oil with the lower periphery of the oil absorbing roller immersed, propulsion means arranged to propel the machine forwardly when floating, rotation means arranged to rotate the oil absorbing roller in the direction of movement of the machine, at least one pinch roller arranged to bear against the oil absorbing roller compressing the oil absorbing covering and squeezing oil therefrom, and oil collection means arranged to collect oil squeezed from the covering.

Preferably said oil absorbing roller is positioned toward the front of the chassis and a support roller is provided rotatably mounted transversely across the chassis toward the rear thereof such that the oil absorbing roller and the support roller support the weight of the machine on land.

Preferably said flotation means comprise vertically adjustable floats arranged to be raised relative to the chassis when the machine is operating on land and to be lowered when the machine is operating in water, the depth of immersion of the lower periphery of the oil absorbing roller being controllable by vertical adjustment of the floats relative to the chassis.

Preferably the oil absorbing covering comprises a sleeve over the oil absorbing roller, the sleeve being axially removable from the roller.

Preferably the oil absorbing roller has a flexible pneumatically supported peripheral surface arranged to be deflated for installation or removal of a sleeve, and to be inflated beneath the sleeve for engagement of the sleeve and for supporting the chassis of the machine on land.

DESCRIPTION OF THE DRAWINGS

Notwithstanding any other forms that may fall within its scope, one preferred form of the invention will now be described by way of example only with reference to the accompanying drawings, in which.

DESCRIPTION OF THE PREFERRED EMBODIMENT

In the preferred form of the invention an amphibious oil spill absorbing machine capable of absorbing oil floating on the surface of water, or oil which has been deposited on a beach or mud-flat surface is constructed as follows.

Figure 1:
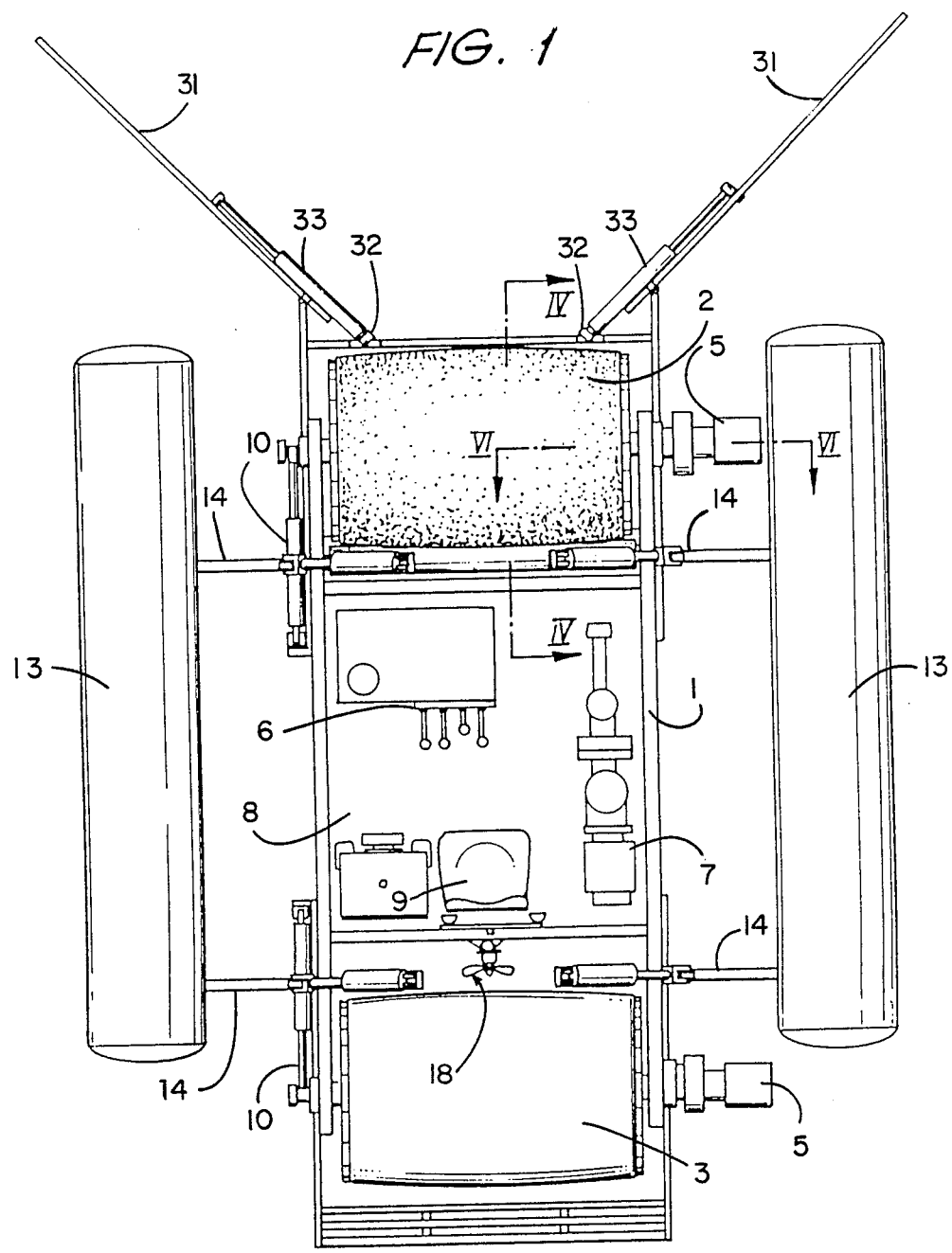
FIG. 1 is a plan view of an amphibious oil spill absorbing machine according to the invention.

The machine comprises a basic chassis (1) on which are rotatably mounted two main rollers, namely an oil absorbing roller (2) and a support roller (3) each supported in bearings (4) with their axes of rotation transverse to the intended direction of movement of the machine. The machine when viewed in plan view as shown in FIG. 1 is intended to move toward the top of the page with the oil absorbing roller (2) leading. The rollers (2) and (3) are positioned in the chassis (1) with their lower peripheries below the level of the chassis as may be seen in FIGS. 2 and 3 so that the machine may be supported on the rollers on land and moved forwardly by rotation of the rollers.

The rollers are rotated by drive means in the form of hydraulic motors (5) driven by way of suitable controls (6) from a hydraulic pump driven by a motor (7). The chassis of the machine is provided with a driving platform (8) on which is mounted an operator's seat (9) so that the operator may drive the machine by operation of the controls (6).

Figure 5:
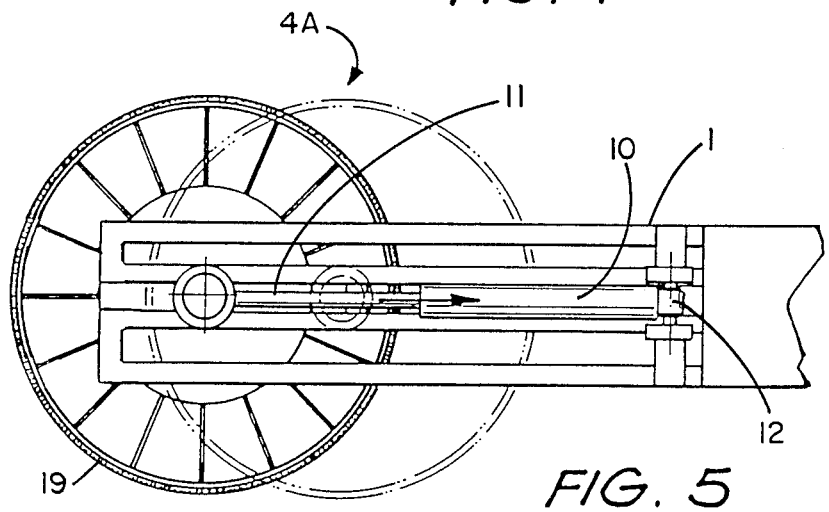
FIG. 5 is an end elevation of the front roller in the machine.

At the end of each roller adjacent the hydraulic motors (5), the bearings (4) are pivotally mounted in the chassis (1) by way of vertical "king pins" and the bearings at the opposite ends of the rollers are adapted to be moved forwardly and rearwardly actuated by hydraulic rams (10) for steering of the vehicle as may be seen in FIG. 5. The bearing (4) is mounted in a slot (11) in the chassis (1) so that it may be moved between a forward position shown in solid outline in FIG. 5 and a rearward position 4A shown in broken outline in FIG. 5 under the action of the hydraulic ram (10) which is secured to the chassis at point (12). The hydraulic rams (10) are coupled to the controls (6) such that the machine may be turned to the left (when viewed as shown in FIG. 1) by contracting the two hydraulic rams, and turned to the right by expanding the two hydraulic rams, angling the rollers accordingly.

Figure 2:
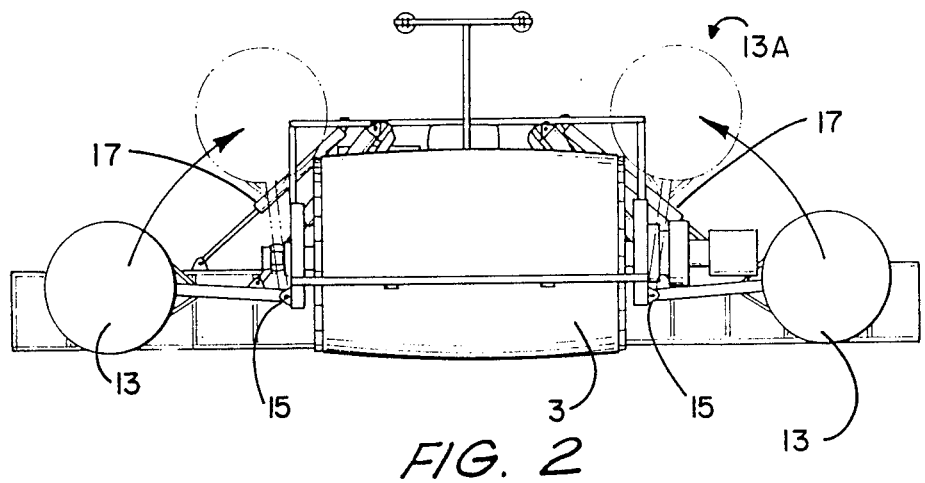
FIG. 2 is a rear view of the machine shown in FIG. 1.

The machine is further provided with flotation means in the form of elongate floats (13) arrayed along the sides of the chassis (1) and secured to the chassis by swing arms (14) pivotally mounted about pivot points (15) [FIG. 2]. The floats are located and supported in desired positions by hydraulic rams (17) which may be elongated or contracted by operation of the controls (6) to raise or lower the floats between a lower position shown in solid outline in FIG. 2 and a raised position (13A) shown in broken outline. The positions of the floats may be adjusted by operation of the hydraulic rams (17) so that the machine may float on the surface of water [or an oil-water mix] with the lower peripheries of the rollers (2) and (3) immersed to a required degree. For movement over a land surface such as a beach of mud-flat, the floats may be completely raised to the position shown at (13A). In this position the width of the machine is considerably reduced allowing transportation of the machine on a truck or road trailer.

For propulsion of the machine when afloat a propeller drive assembly (18) [FIG. 1] is provided driven by a suitable drive means which is preferably a hydraulic motor operable from the motor pump assembly (7) by way of the controls (6). It is also preferred that the propeller is mounted on an adjustable leg which may be raised or lowered for operation on land or water respectively. In an alternative form of the invention the propulsion means for use on water may take the form of paddle wheels or blades (not shown) located at either end of the rollers (2) and/or (3).

Figure 6:
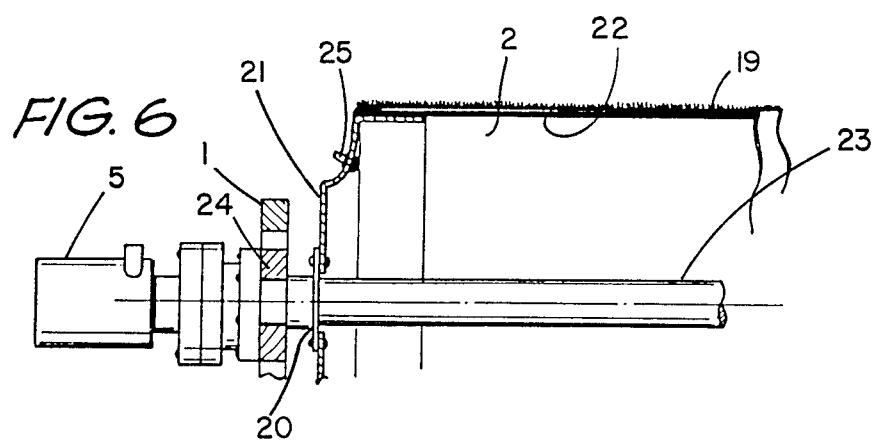
FIG. 6 is a partial cross-sectional elevation on the line VI—VI of FIG. 1.

The oil absorbing roller (2) is covered with an oil absorbing material which is not readily permeable by water but which has a surface tension capable of attracting and absorbing oil. Such materials would typically comprise synthetic piled materials such as materials incorporating a nylon pile, or may alternatively be formed from the hide of a marine animal or from some other animal, e.g. a sheep skin. The roller cover may also be provided with a plurality of radially protruding deformable lugs (e.g. of a plastics material) which mechanically adhere to lumps of grease or oil to remove the lumps from the surface of the water/oil. In the preferred form of the invention the oil absorbing covering takes the form of a sleeve (19) [FIGS. 5 and 6] of piled material which is axially engaged over the roller (2). The roller (2) comprises end hubs (20) [FIG. 6] having a peripheral flange (21) to which is vulcanised a cylindrical rubber sleeve (22). The roller axle (23) is supported in bearings (24) in the chassis (1) and driven by the hydraulic motor (5) as previously described. The interior of the roller is sealed and is pneumatically inflatable by way of valve (25) to pneumatically support the rubber sleeve (22).

To engage the oil absorbing sleeve (19) with the roller (2), the bearing (4) [FIG. 5] is decoupled from the hydraulic ram (10) and moved forwardly out of the slot (11) so that the end of the roller is free of the chassis. The sleeve (19) which is typically of nylon pile carpet may then be axially engaged over the roller whereupon the interior of the roller may be pressurised by way of the valve (25) to inflate the rubber sleeve (22) and firmly engage and support the oil absorbing sleeve (19). The bearing (4) may then be reinserted in the slot (11) and engaged with the hydraulic ram (10) for operation as previously described. In this manner a machine may be equipped with a number of oil absorbing sleeves (19), which may differ in their characteristics so as to be suitable for use with different types of oil, so that a selected sleeve may be used on the machine to deal with a particular type of oil spill, and the sleeves may be simply and readily changed at the site of the oil spill.

Although the oil absorbing cover has been described engaged with the leading roller (2) it will be appreciated that both of the rollers (2) and (3) could be provided with oil absorbing sleeves if required.

Figure 4:
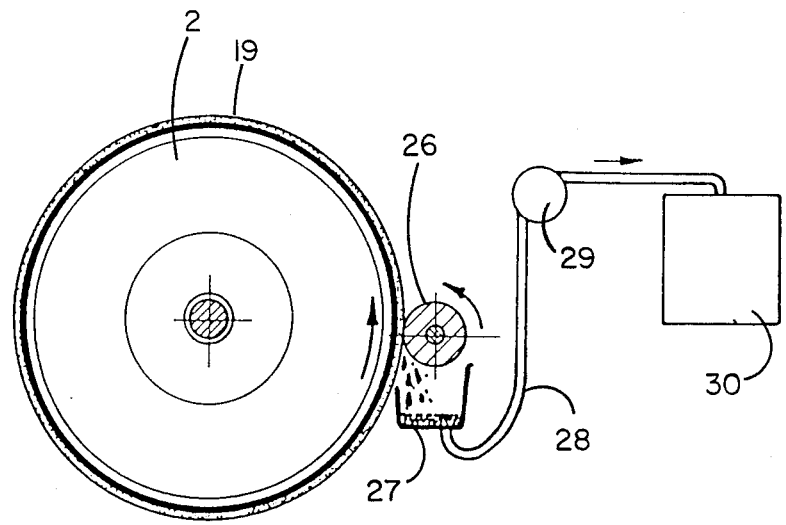
FIG. 4 is a diagrammatic cross-sectional view on the line IV—IV of FIG. 1.

The oil absorbing roller (2) [FIG. 4] operates in conjunction with a pinch roller (26) extending transverely across the chassis of the machine and arranged to bear against the oil absorbing sleeve (19) to compress that sleeve during rotation of the roller (2). An elongate tray or gutter (27) is provided beneath the pinch roller and is connected by way of a drain pipe (28) and a pump (29) to a disposal tank (30).

In use as the machine moves forwardly and the oil absorbing roller (2) rotates, oil is absorbed into the pile of the sleeve (19) and is squeezed from the sleeve by the pinch roller (26) to be discharged into the trough (27) and pumped into the holding tank (30). The holding tank (30) may take any convenient form and may comprise for example a rubber bladder which can be towed behind the machine, disconnected when full, and left for later collection.

Due to the nature of the machine, it is self-propelled and may for example be transported to the site of an oil spill on the back of a truck or trailer, unloaded and then moved under the power of its hydraulic motors (5) into the oil spill area. Because the machine is amphibious it can work on beaches or estuaries at the water's edge whereupon the rolling action of the roller (2) will absorb the oil deposited on the surface of the beach. When desired the machine may be moved into the water and the floats (13) lowered to the position shown in FIGS. 1 and 2 to support the machine in the water and immerse the oil absorbing roller to the desired depth according to the water conditions. As the machine moves forwardly in the water propelled by the propeller (18), the roller (2) is rotated by the motor (5) causing oil floating on the surface of the water to be contacted by the sleeve (19), absorbed, and removed by the pinch roller (26). In this manner the machine may operate either inland or on water and is particularly effective in shallow areas such as beaches or river estuaries where conventional oil spill machinery cannot operate.

Figure 3:
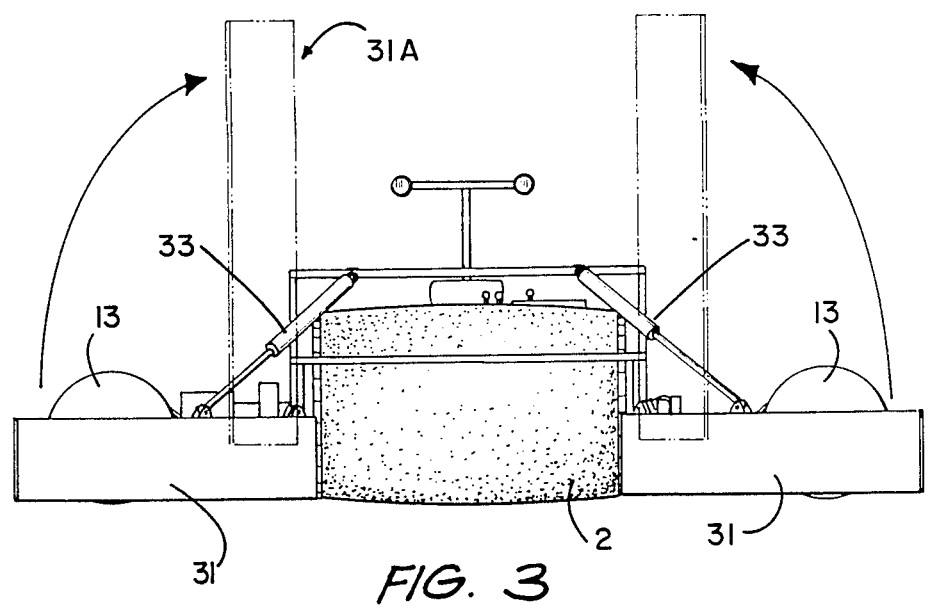
FIG. 3 is a front view of the machine shown in FIG. 1.

To improve the efficiency of the machine when in the floating mode, a pair of booms (31) are provided having generally vertically orientated blades pivotally mounted to the chassis at pivot points (32) and supported by hydraulic rams (33) so that the booms may be pivoted between a horizontal positioned shown in solid outline in FIG. 3 and a vertical position (31A) shown in broken outline, under the operation of the hydraulic rams (33). As can be seen in FIG. 1 the booms are arranged so that as the machine moves forwardly in the water, the oil floating on the surface of the water is gathered by the booms (31) and directed to the oil absorbing roller (2). In this manner the machine may "sweep" a wider path than would otherwise be possible due to the limited width of the roller (2). The booms are retracted to the position (31A) for use of the machine on land or for transportation on a truck or trailer.

In this manner an amphibious oil spill absorbing machine is provided which is self-contained and quick to deploy to the site of an oil spill by transportation on a truck or trailer. Once the site of the oil spill has been reached the machine may be quickly unloaded and put into operation under its own power whereupon the machine may be operated quickly and conveniently to absorb oil from land surfaces or oil which is floating on the surface of the water. Furthermore the machine is particularly effective in operating in areas where there is a land/water interface where conventional machines cannot operate.

What I claim is:

1. An amphibious oil spill absorbing machine comprising a chassis, at least one oil absorbing roller having an oil absorbing covering and being rotatably mounted transversely across the chassis and positioned with the lower periphery thereof below the chassis such that the chassis may be at least partially supported on land by the oil absorbing roller, flotation means adapted to float the machine in water and/or oil, said flotation means comprising vertically adjustable floats arranged to be raised relative to the chassis when the machine is operating on land and to be lowered when the machine is operating in water, the depth of immersion of the lower periphery of the oil absorbing roller being controllable by vertical adjustment of the floats relative to the chassis, propulsion means arranged to propel the machine forwardly when floating, rotation means arranged to rotate the oil absorbing roller in the direction of movement of the machine, at least one pitch roller arranged to bear against the oil absorbing roller compressing the oil absorbing covering and squeezing oil therefrom, and oil collection means arranged to collect oil squeezed from the covering, the oil absorbing covering comprising a demountable sleeve axially removable from the oil absorbing roller which provided with a flexible pneumatically supported peripheral surface arranged to be deflated for installation or removal of the sleeve, and to be inflated beneath the sleeve for engagement of the sleeve and for supporting the chassis of the machine on land.

2. An amphibious oil spill absorbing machine as claimed in claim 1 wherein said oil absorbing roller is positioned toward the front of the chassis and a support roller is provided rotatably mounted transversely across the chassis toward the rear thereof such that the oil absorbing roller and the support roller support the weight of the machine on land.

3. An amphibious oil spill absorbing machine as claimed in claim 1 wherein the propulsion means comprise drive means coupled to a propeller adapted to be lowered and immersed when the machine is floating.

4. An amphibious oil spill absorbing machine as claimed in claim 2 wherein the propulsion means comprise paddle wheels or blades located at either end of the oil absorbing and/or support rollers.

5. An amphibious oil spill absorbing machine as claimed in claim 1 wherein the oil absorbing covering comprises a synthetic pile material.

6. An amphibious oil spill absorbing machine as claimed in claim 1 wherein the oil absorbing covering comprises a natural animal hide.

7. An amphibious oil spill absorbing machine as claimed in claim 1 wherein the oil collection means incorporates an elongate tray or gutter located beneath the pinch roller.

* * * * *